G. STREAT.
WATERPROOF FABRIC.
APPLICATION FILED JUNE 26, 1909.
959,178.
Patented May 24, 1910.
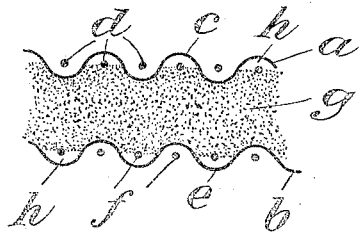
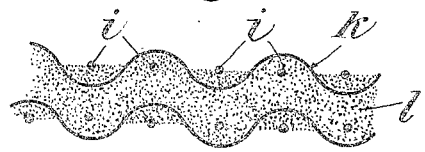
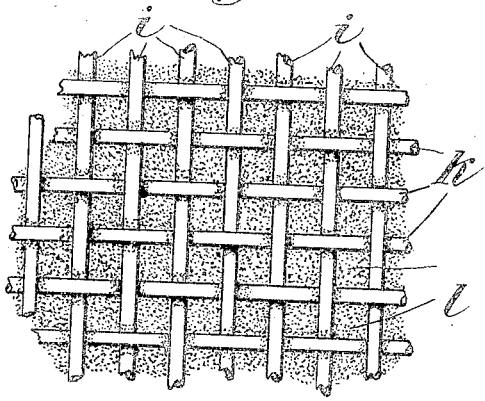
Attest:
Inventor:
by George Streat
Redding, Greeley & Austin
Attys.

UNITED STATES PATENT OFFICE.

GEORGE STREAT, OF NEW YORK, N. Y.

WATERPROOF FABRIC.

959,178.  Specification of Letters Patent.  Patented May 24, 1910.

Application filed June 26, 1909. Serial No. 504,562.

*To all whom it may concern:*

Be it known that I, GEORGE STREAT, a citizen of the United States, residing in the borough of Brooklyn of the city of New York, in the State of New York, have invented certain new and useful Improvements in Waterproof Fabric, of which the following is a specification, reference being had to the accompanying drawing, forming a part hereof.

Waterproof fabric, such as is ordinarily employed for mackintoshes and the like, is made up of an outer or face fabric, an inner or lining fabric, and an interposed sheet of rubber or rubber compound. Heretofore it has been deemed desirable to have quite closely woven fabrics, both for the facing fabric and the lining fabric, and the impervious sheet or rubber or rubber compound has been so applied as to adhere closely to both fabrics but not to penetrate either fabric. It has been believed that this construction was necessary in order to provide a sheet of rubber compound of substantial thickness and also to provide proper protection for the sheet of rubber compound. In the present invention, however, it has been found that by employing fabric of comparatively loose or open weave, both for the face and for the lining, and permitting the rubber compound to enter the meshes, that is, the interstices between the yarns of the fabric, not only can a thoroughly waterproof fabric be produced, with a rubber compound sheet of sufficient thickness or body, but a fabric can be produced which is of much less weight and greater flexibility than the ordinary waterproof fabric of this description. Furthermore, although the rubber compound is made or permitted to enter the meshes of the fabrics, it does not extend beyond or embed the yarns, where they lie upon the outer surface of the fabric, so that the fabric has the "feel" of the woven fabric rather than the "feel" of a rubber sheet. The rubber compound may be visible, especially under a magnifying glass, between the yarns which lie upon the surface, and if the general tone of color of the fabric is such as to render this objectionable, the rubber compound may be suitably colored to harmonize with the fabric.

The invention will be more fully explained hereinafter with reference to the accompanying drawing in which it is illustrated and in which—

Figure 1 is a view in cross section, but somewhat exaggerated, of an ordinary waterproof fabric. Fig. 2 is a similar view illustrative of the improved fabric, and Fig. 3 is a still more exaggerated face view of the improved fabric.

In order that the nature of the invention may be more clearly understood, the ordinary construction of mackintosh fabric will be explained briefly with reference to the illustrative presentation thereof in Fig. 1. In this illustration the face fabric $a$ and the lining fabric $b$ are both of comparatively close weave, that is, the warps $c$ lie close together and the weft yarns $d$ lie close together, so that there is practically no open or free space between them. Similarly the warps $e$ of the lining fabric $d$ lie close together as do the weft yarns $f$ thereof. The sheet of interposed rubber compound $g$ is so applied to the fabrics that it does not enter the meshes or interstices of the fabric, but lies substantially between the fabrics although adhering closely to both. The relation of the rubber compound to the fabrics is illustrated by the clear space between each warp yarn $o$ where it passes above the weft yarn and by the absence of stippling between each warp yarn and the weft yarn where the warp yarn passes below the weft. That is the threads of each fabric lie so close together that the rubber compound does not enter between them but merely adheres closely to the inner surface of the fabric.

In the illustrative presentation of the improved fabric in Figs. 2 and 3 it will be noted first that each weft thread $i$ stands relatively much farther from its neighbor than in a closer woven fabric represented in Fig. 1, and that, similarly, each warp yarn $h$ stands relatively much farther from its neighbor. In other words such fabric is more loosely or openly woven, the openings between the yarns being relatively much greater, in proportion to the diameters of the yarns, than in the closely woven fabric. Therefore, when the sheet of rubber compound $l$ is applied, being of proper consistency, it enters the interstices or openings between the yarns much more than in the case of the closely woven fabric. Care is taken in the manufacture of the fabric to have the rubber compound of suitable consistency so that it shall enter the interstices but shall not cover or embed the yarns where they come to the surface. This relation of the rubber compound, or other compound which may be employed, to the yarns of the fabric, is indicated in Figs. 2 and 3, where the stippling is extended beyond the yarns where they pass under the transverse yarns and lie at the inner surface of the fabric, but does not extend beyond or include the yarns where they lie over the transverse yarns or appear at the outer surface of the fabric. In this manner a sheet of rubber compound or other waterproofing material of sufficient thickness, ample to make the whole fabric waterproof, is secured, while at the same time the thickness and weight of the fabric are much less than in the fabric as ordinarily constructed, and the fibers of the yarns, where the yarns pass over transverse yarns, lie wholly at the surface and give the characteristic "feel" of the woven fabric. It is of course necessary in order that the rubber compounds may enter the interstices and extend beyond or embed the yarns where they pass under transverse yarns that the fabric be made up, as shown, of yarns which are comparatively smooth, that is what are commonly known as well-twisted yarns.

I claim as my invention:

1. A waterproof fabric consisting of a woven facing fabric, a woven lining fabric and an interposed sheet of waterproofing compound, one of said fabrics being loosely woven of well twisted yarns, the interstices between the yarns of said fabric being entered by the waterproofing compound, the yarns of said fabric where they pass over transverse yarns lying above the waterproofing compound and the yarns where they pass under transverse yarns being embedded in the waterproofing compound.

2. A waterproof fabric consisting of a facing fabric loosely woven of well twisted yarns, a lining fabric loosely woven of well twisted yarns, and an interposed sheet of waterproofing compound, the interstices between the yarns of the facing fabric and the lining fabric being entered by the waterproofing compound, the yarns where they pass over transverse yarns lying above the waterproofing compound and the yarns where they pass under transverse yarns being embedded in the waterproofing compound.

This specification signed and witnessed this 23d day of June, A. D., 1909.

GEORGE STREAT.

Signed in the presence of—
ELLA J. KRUGER,
EDWARD F. RAEHM.